US012558694B2

(12) United States Patent
Schmidtchen

(10) Patent No.: US 12,558,694 B2
(45) Date of Patent: Feb. 24, 2026

(54) METHOD FOR GRINDING MACROALGAE

(71) Applicant: SEA6 TECHNOLOGIES EUROPE B.V., Utrecht (NL)

(72) Inventor: Ludwig Schmidtchen, Dresden (DE)

(73) Assignee: SEA6 TECHNOLOGIES EUROPE B.V., Utrecht (NL)

( * ) Notice: Subject to any disclaimer, the term of this patent is extended or adjusted under 35 U.S.C. 154(b) by 0 days.

(21) Appl. No.: 19/104,217

(22) PCT Filed: Aug. 14, 2023

(86) PCT No.: PCT/EP2023/072403
§ 371 (c)(1),
(2) Date: Feb. 15, 2025

(87) PCT Pub. No.: WO2024/038022
PCT Pub. Date: Feb. 22, 2024

(65) Prior Publication Data

US 2025/0281932 A1 Sep. 11, 2025

(30) Foreign Application Priority Data

Aug. 17, 2022 (EP) .................................... 22190729

(51) Int. Cl.
*B02C 19/22* (2006.01)

(52) U.S. Cl.
CPC .................................... *B02C 19/22* (2013.01)

(58) Field of Classification Search
CPC ...................................................... B02C 19/22
See application file for complete search history.

(56) References Cited

U.S. PATENT DOCUMENTS 3,536,115 A * 10/1970 Weiler .................... A23N 17/02 241/82.5
2004/0021019 A1* 2/2004 Gaartz .................. B02C 18/302 241/92

FOREIGN PATENT DOCUMENTS

DE 4115069 C2 11/1992
DE 102012203148 B3 * 8/2013 ............. B02C 19/06
(Continued)

OTHER PUBLICATIONS

English translate (DE102012203148B3), retrieved date Jun. 29, 2025.*

*Primary Examiner* — Mohammed S. Alawadi
(74) *Attorney, Agent, or Firm* — Patent Technologies, LLC; Robert D. Gunderman, Jr.

(57) ABSTRACT

The present invention relates to a method (1) for comminuting macroalgae in a process chamber (4), wherein at least one first conveying device (7.1) and at least one first comminuting device (7.2) are arranged in the process chamber (4), the method (1) comprising the steps of: filling the macroalgae (8) into the first conveying device (7.1); feeding the macroalgae (8) to the first comminuting device (7.2) by means of the first conveying device (7.1); comminuting the macroalgae (8) in the first comminuting device (7.2) by means of pressure, friction and/or shearing; and discharging the comminuted macroalgae (8) from the first comminuting device (7.2) by means of subsequently conveyed macroalgae, wherein the moisture content of the macroalgae (8) in the first conveying device (7.1) is set so that the comminuted macroalgae (8) are pasty when they are discharged from the first comminuting device (7.2). The invention also relates to a corresponding device (3).

11 Claims, 1 Drawing Sheet

(56) References Cited

FOREIGN PATENT DOCUMENTS

| | | | |
|---|---|---|---|
| EP | 2977106 | B1 | 1/2016 |
| GB | 2 255 517 | A | 11/1992 |
| KR | 100824583 | B1 | 4/2008 |

* cited by examiner

METHOD FOR GRINDING MACROALGAE

TECHNICAL FIELD

The present invention relates to a method for grinding, in particular finely grinding, macroalgae in a process chamber. The present invention further relates to a device for grinding macroalgae according to such a method.

BACKGROUND OF THE INVENTION

Methods for grinding materials are variously known in the prior art. For example, various grinding processes by use of pressure, stroke, friction, shearing or impact, as well as corresponding devices are known.

Grinding of macroalgae by use of known methods is subject to various problems in different moisture content ranges. When dried macroalgae are ground, the problem arises that they are tough to hard and can only be ground with low mechanical efficiency. The heat generated during this process stresses the macroalgae and the grinding device, and the grinding device is subject to high wear. At medium moisture contents, the macroalgae can be ground with better mechanical efficiency, but they are then present as a highly sticky paste that clogs the grinding device. Ultimately, macroalgae can be easily ground at very high moisture levels, however, in doing so, important constituents of the macroalgae go into solution with the liquid and are removed during subsequent drying, and are thus no longer available for further processing, for example crosslinking, of the ground macroalgae.

A method for grinding biomass, in particular grass and straw fibers mixed in liquid manure, by means of a screw arrangement, is known from DE 41 15 069 C2.

A device for grinding biomass, including algae, by use of a feeding device designed as a conveyor spindle, is known from EP 2 977 106 B1.

DESCRIPTION OF THE INVENTION

In view of this situation, it is an object of the present invention to propose a method for grinding macroalgae in which at least one of the aforementioned problems does not exist.

The object of the invention is achieved by the features of the independent main claims. Advantageous embodiments are provided in the subclaims. If technically possible, the teachings of the subclaims can be arbitrarily combined with the teachings of the main and subclaims.

Hereinafter, advantages of the claimed aspects of the invention are explained and further below, preferred modified embodiments of the aspects of the invention are described. Explanations, in particular with respect to advantages and definitions of features, are basically descriptive and preferred, but not limiting examples. If an explanation is limiting, this is explicitly mentioned.

Insofar as elements are designated by means of numbering, for example "first element", "second element" and "third element", this numbering is intended purely for differentiation in the designation and does not imply any interdependency of the elements or a mandatory order of the elements. This means in particular that, for example, a device or a method does not have to comprise a "first element" in order to comprise a "second element". The device or the method can also comprise a "first element" and a "third element", but without necessarily comprising a "second element". It is also possible to provide several units of an element of a single numbering, for example several "first elements".

According to a first aspect of the invention, the object is achieved by a method for grinding macroalgae in a process chamber, wherein at least one first conveying device and at least one first grinding device are arranged in the process chamber, wherein the method comprising the steps of: filling the macroalgae into the first conveying device, feeding the macroalgae to the first grinding device by means of the first conveying device, grinding the macroalgae in the first grinding device by means of pressure and/or shearing and discharging the ground macroalgae from the first grinding device by subsequently conveyed macroalgae, wherein the moisture content of the macroalgae in the first conveying device is adjusted in such a way that the ground macroalgae are pasty when discharged from the first grinding device.

A process chamber is formed by a cavity which can be filled, for example, via inlets and emptied, for example, via outlets, wherein inlets and outlets also can coincide. The process chamber is preferably formed with one or more inlets and one or more outlets, wherein, in a continuous manner, macroalgae are supplied through the inlet(s) and ground macroalgae are discharged via the output/outputs. The input(s) and the output(s) are then sealed, for example, by the macroalgae, so that a pressure that is higher than that of the environment can prevail within the process chamber. Preferably, in or at a process chamber, means for tempering and adjusting the pressure prevailing in the process chamber are provided.

Insofar as macroalgae are generally referred to at the input side, these may be macroalgae that have not been ground and/or have not been pretreated except for the adjustment of the moisture content. The macroalgae may also be present at the input already ground to a certain degree, roughly ground, and/or pretreated, wherein in which case the term macroalgae is still used generally.

A conveying device causes the macroalgae to be transported, for example by displacing the macroalgae therein in a conveying direction, for example by pulling and/or pushing. In general, a conveying force is applied to the macroalgae by a conveying device in the conveying direction. In this case, the macroalgae are held on a conveying device, for example, by friction or in a clamping manner, in order to apply the conveying force to the macroalgae. Preferably, the first conveying device is designed as a screw element which rotates about a longitudinal axis and comprises helical flanks for conveying the macroalgae.

A grinding device effects a grinding of the macroalgae, for example by means of pressure, by means of friction and/or by means of shearing. The first grinding device is designed, for example, as a cutting mill or colloid mill. The first grinding device is preferably designed as a screw element, in which flanks formed around a longitudinal axis apply pressure, friction and shearing on the macroalgae and thus effect the grinding. The screw elements of the first grinding device differ in particular from screw elements of the conveying device in the proportion of the extension of the flanks in the circumferential direction compared to the proportion of the extension of the flanks in the axial direction of the screw elements. Screw elements of the grinding device preferably extend mainly in the circumferential direction and thus form flanks facing approximately in the radial direction.

The macroalgae are pushed through the grinding device in the conveying direction by the conveying force originating from the first conveying device and are discharged from the grinding device on the opposite side of the grinding device. Macroalgae are therefore fed to the grinding device by means of the conveying device until the space available in the grinding device for the macroalgae is filled, so that a subsequent further feeding of macroalgae inevitably leads to a transfer of the conveying force to the macroalgae present in the grinding device and a corresponding conveying within the grinding device.

Insofar as the moisture content in the first conveying device is adjusted according to the first aspect of the invention, it is ensured that the desired moisture content is present at the transition between the first conveying device and the grinding device. This can be realized, for example, by filling macroalgae that already have the desired moisture content into the first conveying device. It can also be provided that macroalgae in that have not yet reached the desired moisture content when they are filled in are dehumidified or humidified in the first conveying device, for example by squeezing out liquid or by additionally supplying liquid to the process chamber.

Insofar as ground macroalgae are present in a pasty state, they are not inherently flowable, but they do exhibit fluid flow properties when external forces, such as the conveying force, are applied. A pasty state thus represents an intermediate state between a solid and a liquid aggregate state. The actual properties, such as the shear to be applied for conveying the pasty ground macroalgae, are obtained as a range, wherein the properties are adjusted depending on the specific macroalgae used and the specific design of the first conveying device and/or the first grinding device via the moisture content of the macroalgae in the first conveying device in this range. The properties are preferably adjusted in such a way that the best possible ratio between low grinding force and low conveying force is achieved. In particular, pasty ground macroalgae have a high adhesiveness, so that an adhesive bond is formed between non-conveyed and thus stationary ground macroalgae and elements of the grinding device, which influences the conveying force to be applied for conveying.

The first aspect of the invention now includes the teaching that for grinding the macroalgae in a medium range of moisture content in which the ground macroalgae are present in a pasty state, a first grinding device acting with pressure, friction and/or shearing is combined with an upstream first conveying device in such a way that the macroalgae are conveyed through the first grinding device. The conveying force thus prevents the first grinding device from becoming clogged, in order to enable grinding in the medium range of moisture content at a higher mechanical efficiency compared to the grinding of dry macroalgae and without the dissolution of constituents of the macroalgae at excessively high moisture contents. This provides a method for grinding macroalgae that can be carried out with little force during grinding, without clogging of the first grinding device and with little heating. In particular, the grinding is carried out continuously according to the method of the first aspect of the invention in order to exert a permanent conveying force on the ground macroalgae disposed in the first grinding device.

The process of the method according to the first aspect of the invention is particularly preferably adapted to provide a starting material for a downstream method for crosslinking or polymerizing polysaccharides from the macroalgae to form a polymer material and in particular for producing a bioplastic product. The process for crosslinking is, for example, implemented directly downstream of the method according to the first aspect of the invention, or the processes may overlap in time and location. In particular, process chambers of the processes form a unit with each other, for example as a continuous screw extruder. It is preferred if in the method according to the first aspect of the invention, aspects are already taken into account that only become relevant in the process for crosslinking, such as a good digestion of the polysaccharides or a certain composition of the starting material produced according to the first aspect of the invention, which is advantageous for the downstream process.

In one embodiment of the first aspect of the invention it is provided that the moisture content of the macroalgae is adjusted to between 20 and 95%. Preferably, the moisture content of the macroalgae is adjusted to between 25 and 95%. More preferably, the moisture content of the macroalgae is adjusted to between 30 and 88%. More preferably, the moisture content of the macroalgae is adjusted to between 30 and 70%. Even more preferably, the moisture content of the macroalgae is adjusted to between 45 and 70%. In the ranges mentioned, for most known macroalgae types, in particular for macroalgae types that are used for the subsequent polymerization and production of bioplastic products, a minimum of the sum of the conveying effort and the grinding effort can be advantageously achieved in a method according to the first aspect of the invention.

In a further embodiment, in order to adjust the moisture content of the macroalgae a liquid is supplied to the first conveying device. By supplying the liquid, the moisture content of the macroalgae is increased for adjustment when the liquid is mixed with the supplied macroalgae. The liquid is, for example, essentially formed from water and can also contain additives. In particular, the liquid can also include solids which, for example, are or become liquid at the temperature and pressure prevailing in the process chamber.

An additive is used, for example, for various process-related functions, such as improved flow properties of the macroalgae in their pasty form or to achieve a certain property of a polymer material produced downstream or of a bioplastics product produced from it, for example a certain mechanical property. Such an additive can also be introduced into the process if, in addition to the macroalgae, further starting materials, such as recycled macroalgae or polysaccharides derived therefrom, which include the additive are introduced into the first grinding device. This is relevant, for example, if, in addition to grinding in the process chamber a composition is to be achieved that is suitable for immediate further processing.

For example, glycerol and/or sorbitol is added as an additive. In further embodiments, at least one additive is formed by pentaerythritol, polyol, sugar alcohol, poly(oxyethylene), poly(oxypropylene), non-ionic surfactants and/or anionic surfactants, which respectively act in particular as plasticizers in a bioplastic product. Other preferred additives, which act in particular as solvents, are glycols, for example ethylene glycol or diethylene glycol, methanol, ethanol, maltodextrin and/or urea. Moreover, the following components may be used as additives: 1,3-butylene glycol, acetic and fatty acid esters of glycerol, acetone, acetylated distarch adipate, acetylated monoglycerides, acid-treated starch, alkali-treated starch, ascorbic acid, palmitic acid ascorbyl ester, ascorbyl stearate, azodicarboxamide, beeswax, bleached starch, bone phosphate, brominated vegetable oil, calcium acetate, calcium aluminum silicate, vegetable oils, calcium ascorbate, calcium benzoate, calcium bromate, calcium carbonates, calcium chloride, calcium citrate, calcium dihydrogen phosphate, calcium ferrocyanide, calcium gluconate, calcium hydrogen sulfite, calcium hydroxide, calcium iodate, calcium lactate, calcium lactate gluconate, calcium lactobionate, sucrose calcium peroxide, calcium phosphate, calcium polyphosphates, calcium salts of fatty acids, calcium silicate, calcium sorbate, calcium stearate, calcium stearoyl lactylate, calcium sulfate, calcium tartrate, soy protein, calcium iodate, candelilla wax, carnauba wax, locust bean gum, castor oil, citric acid, pea protein, citric acid and fatty acid esters of glycerol, crosslinked sodium carboxymethylcellulose, carboxymethylcellulose, copper sulfate of mono and diglycerides of fatty acids, diammonium hydrogen phosphate, dicalcium pyrophosphate, diethylpyrocarbonate, ethyl alcohol, ethyl cellulose, ethylhydroxyethyl cellulose, esters of glycerol and thermally oxidized soy fatty acids, zein, ethoxylated mono- and diglycerides, ethylhydroxyethylcellulose, formic acid, gelatin, glycerin, guar gum, gum arabic, peroxide derivatives, hydrogen peroxide, hydroxylated lecithin, hydroxypropylcellulose, hydroxypropyl distarch, cellulose derivatives.

Preferably, a process temperature prevailing in the process chamber is between 20 and 150° C. More preferably, the process temperature prevailing in the process chamber is between 50 and 150° C. In these temperature ranges, the macroalgae are already pre-tempered for crosslinking of the macroalgae or the polysaccharides contained therein, which is carried out downstream of the method according to the invention.

Preferably, a process pressure prevailing in the process chamber is between 0.5 and 500 bar. In this pressure range, the most common macroalgae are sufficiently ground, in particular finely ground.

Particularly preferably macroalgae of the species Rhodophyta, in particular the species Kappaphycus Alvarezii and Eucheuma Denticulatum, Phaeophycae and/or Chlorophyta are used as microalgae. These types of macroalgae are particularly suitable for downstream crosslinking and the production of bioplastics products.

In a preferred embodiment, the macroalgae are dried, at least partially refined, preconditioned and/or pretreated with acid and/or base prior to being fed to the first grinding device. Dried macroalgae are then adjusted in their moisture content in the first conveying device, for example, by adding liquid. The refining, preconditioning or treating with acid and/or base favorably achieves improved process properties of the macroalgae for grinding and/or downstream crosslinking. For example, the macroalgae are modified by the aforementioned processes in their mechanical properties for simplified grinding. In this way, for example, softer macroalgae, a reduced toughness and/or a reduced brittleness is achieved. Furthermore, for example, polysaccharides contained in the macroalgae are released from the macroalgae for crosslinking or made accessible for downstream crosslinking.

In one embodiment, a second conveying device is arranged in the process chamber, wherein ground macroalgae discharged from the first grinding device are conveyed away from the first grinding device by means of the second conveying device. This ensures that ground macroalgae discharged from the first grinding device are immediately conveyed away and thus do not block the exit area of the first grinding device and/or cause the necessary conveying force to be applied by the first conveying device to increase. The second conveying device thus applies a further conveying force to the ground macroalgae.

In a further embodiment, which has already been referred to above, the first conveying device, the second conveying device and/or the first grinding device are designed as screw elements of a screw extruder, in particular a twin-screw extruder. In a screw extruder, the first conveying device and the first grinding device can advantageously be arranged directly one after the other on a common shaft, so that the conveying force applied by the first conveying device can act directly into the first grinding device. Furthermore, screw elements designed for this purpose are particularly suitable for grinding macroalgae or, depending on the macroalgae used, can be adapted in their geometry for a particularly good mechanical efficiency during grinding.

In a preferred implementation of the aforementioned embodiment, the screw elements are arranged in a housing, wherein the housing comprises a contoured inner wall. For example, the inner wall has a groove or tongue extending in the axial direction or helically. The contouring of the inner wall ensures that macroalgae located in the screw elements are held against the inner wall and thus are prevented from turning together with the screw elements, which would lead to a reduced efficiency during grinding.

According to a second aspect of the invention, the object is achieved by a device for grinding macroalgae, comprising: a process chamber, at least one first conveying device and at least one first grinding device, wherein the grinding device is configured to carry out a method according to the first aspect of the invention. With the grinding device, the advantages achieved with respect to the first aspect of the invention are achieved accordingly. In particular, with the grinding device, it is possible to grind macroalgae in a medium moisture range with good mechanical efficiency and without releasing constituents of the macroalgae and without clogging the first grinding device.

In an embodiment already described as advantageous with respect to the first aspect of the invention, the device comprises a second conveying device for conveying away ground macroalgae from the first grinding device, which are discharged from the first grinding device.

Further preferred and already described as advantageous, the device is configured as a screw extruder. In a preferred embodiment, the screw extruder is a twin-screw extruder having two screws arranged on parallel axes of rotation and interacting with each other. In a further preferred embodiment, the screw extruder is configured in the form of a single-screw extruder, for example with fixed shearing and/or cutting elements at the housing side and shearing and/or cutting elements arranged at the screw/formed by the screw as a grinding device. Particularly preferred, the screw extruder comprises a housing with a contoured inner wall.

BRIEF DESCRIPTION OF THE DRAWINGS

Hereinafter, the invention will be explained in more detail with reference to the accompanying drawings based on preferred embodiments. The phrase "Figure" is abbreviated to "FIG." in the drawings.

In the drawings.

DETAILED DESCRIPTION OF THE DRAWINGS

The described exemplary embodiments are only examples that can be modified and/or supplemented in a variety of ways within the scope of the claims. Each feature described for a particular exemplary embodiment can be used independently or in combination with other features in any other exemplary embodiment. Each feature described for an exemplary embodiment of a particular claim category can also be used in a corresponding manner in an exemplary embodiment of a different claim category.

Figure 1:
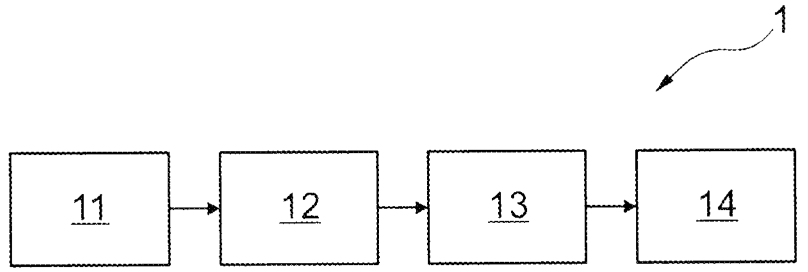
FIG. 1 is a schematic process diagram of a method according to the first aspect of the invention.

FIG. 1 shows a method 1 according to the first aspect of the invention for grinding macroalgae in a process chamber, wherein at least one first conveying device and at least one first grinding device are arranged in the process chamber.

In a first step 11, macroalgae are filled into the first conveying device. Here, the macroalgae are untreated, dried, at least partially refined, preconditioned and/or pretreated with acid and/or base. Particularly preferably, macroalgae of the species Rhodophyta, in particular the species Kappaphycus Alvarezii and Eucheuma Denticulatum, Phaeophycae and/or Chlorophyta are used as microalgae. In addition to the macroalgae, further substances, in particular a liquid and/or additives, can be introduced into the first conveying means.

In a second step 12, the macroalgae are fed to the first grinding device by means of the first conveying device. For this purpose, a conveying force is applied to the macroalgae by the first conveying device.

In a third step 13, the macroalgae are ground in the first grinding device by means of pressure, friction and/or shearing. In a fourth step 14, the ground macroalgae are discharged from the grinding device by subsequently conveyed macroalgae. The macroalgae subsequently conveyed from the first feeding device into the first grinding device thus push the ground macroalgae out of the first grinding device. The moisture content of the macroalgae is adjusted in advance in the first conveying device so that the ground macroalgae when discharged from the first grinding device are in a pasty state, i.e. in an intermediate state between liquid and solid aggregate state, in which the ground macroalgae are not flowable on their own, but are flowable under external forces. The moisture content is adjusted in particular by dehumidifying or humidifying the macroalgae in the first conveying device.

Figure 2:
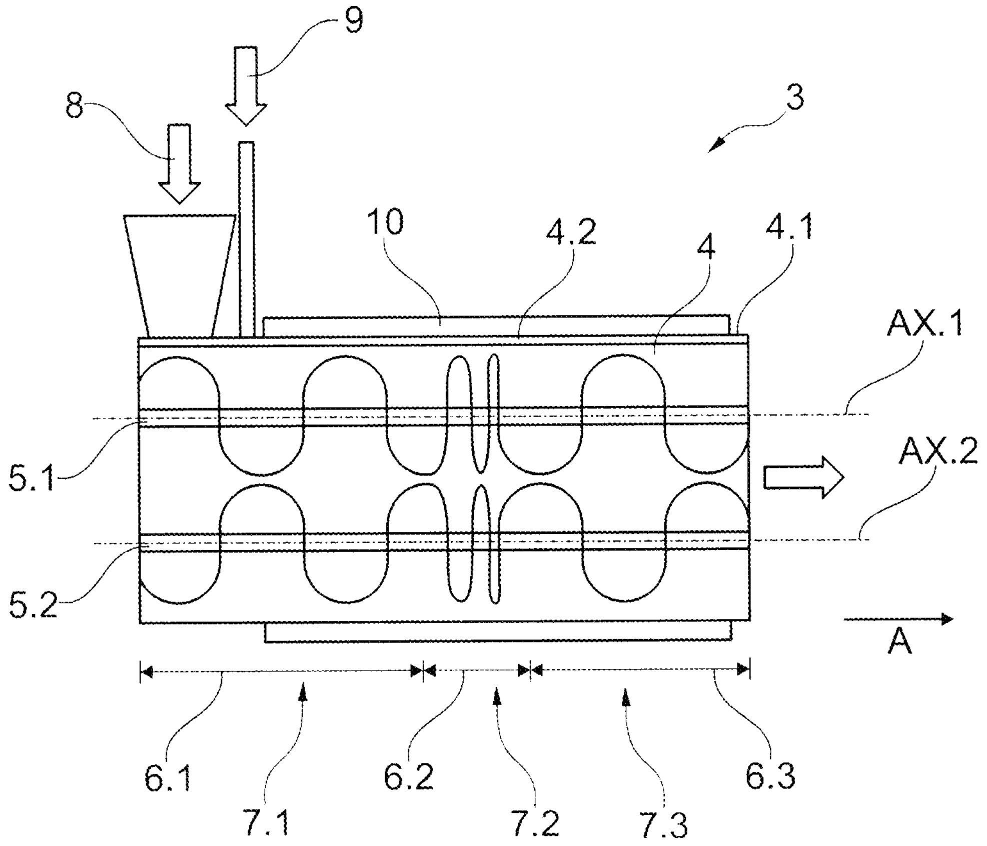
FIG. 2 is a schematic sectional view of a device according to the second aspect of the invention.

FIG. 2 shows a device 3 for grinding macroalgae according to the second aspect of the invention/for carrying out a method 1 according to the first aspect of the invention. The device 3 is configured as a twin-screw extruder and comprises a process chamber 4, which is formed by a housing 4.1 and in which two screws 5.1, 5.2 are arranged on parallel axes of rotation AX.1, AX.2. The screws 5.1, 5.2 strongly simplified comprise windings with helically extending flanks. The windings or flanks of the two screws 5.1, 5.2, moreover, have geometries corresponding to each other und mirrored with respect to one another.

The screws 5.1, 5.2 are formed from several merging screw elements 6.1, 6.2, 6.3, wherein the first screw element 6.1 forms a first conveying device 7.1 with windings extending strongly in the axial direction A. Macroalgae 8 are filled into the first conveying device 7.1 via a funnel and a liquid 9 is filled into the process chamber 4 via a hose, and these are then conveyed by means of the first conveying device 7.1 to a first grinding device 7.2, which is formed by the second screw element 6.2. In the first grinding device 7.2, the windings extend less strongly in the axial direction A and more strongly in the circumferential direction, so that the distance between the windings decreases and pressure, friction and shearing act on the macroalgae 8 for grinding them. The macroalgae 8 are thereby pushed through the first grinding device 7.2 by means of the conveying force of the first conveying device 7.1. Finally, the third screw element 6.3 forms a second conveying device 7.2, which in turn, like the first conveying device 7.1, is configured with windings extending strongly in the axial direction A and conveys ground macroalgae 8 discharged from the first grinding device 7.2 away from the first grinding device 7.2 by means of a further conveying force.

The screws 5.1, 5.2 cause a process pressure to build up over the course of the screw elements 6.1, 6.2, 6.3. Furthermore, the macroalgae 8 located in the process chamber 4 are tempered to a process temperature by means of tempering means 10. Moreover, heat energy is also introduced via the mechanical work that the screws 5.1, 5.2 perform on the macroalgae 8. The housing 4.1 further has a contoured inner wall. For this purpose, a tongue 4.2 extending in the axial direction A is arranged on the inner wall, by means of which the macroalgae 8 are prevented from rotating with the screws 5.1, 5.2.

The invention claimed is:

1. A method (1) for grinding macroalgae (8) in a process chamber (4), wherein at least first conveying device (7.1) and a grinding device (7.2) are arranged in the process chamber (4), wherein the method (1) comprises steps of:
- filling the macroalgae (8) into the at least first conveying device (7.1);
- feeding the macroalgae (8) to the grinding device (7.2) by means of the at least first conveying device (7.1);
- grinding the macroalgae (8) in the grinding device (7.2) by means of pressure, friction and/or shearing; and
- discharging the ground macroalgae (8) from the grinding device (7.2);
- wherein a moisture content of the macroalgae (8) in the at least first conveying device (7.1) is set in such a way that the ground macroalgae (8) are pasty when discharged from the grinding device (7.2).

2. The method (1) according to claim 1, wherein the moisture content of the macroalgae (8) is set to 20 to 95% and still even more preferably 45 to 70%.

3. The method (1) according to claim 1, wherein a liquid (9) is supplied to the at least first conveying device (7.1) to adjust the moisture content of the macroalgae (8).

4. The method (1) according to claim 1, wherein a process temperature prevailing in the process chamber (4) is between 20 and 150° C.

5. The method (1) according to claim 1, wherein a process pressure prevailing in the process chamber (4) is between 0.5 and 500 bar.

6. The method (1) according to claim 1, wherein the macroalgae (8) are species Rhodophyta, Phaeophycae and/or Chlorophyta.

7. The method (1) according to claim 1, wherein the macroalgae (8) are dried, at least partially refined, preconditioned and/or pretreated with acid and/or base before being fed to the grinding-device (7.2).

8. The method (1) according to claim 1, wherein the at least first conveying device (7.1) is supplied with at least one additive.

9. The method (1) according to claim 1, wherein at least one second conveying device (7.3) is arranged in the process chamber (4) and wherein by means of the at least one second conveying device (7.3) the ground macroalgae (8) discharged from the grinding device (7.2) are conveyed away from the grinding device (7.2).

10. The method (1) according to claim 9, wherein the at least first conveying device (7.1), the at least one second conveying device (7.3) and/or the grinding device (7.2) are designed as screw elements (6.1, 6.2, 6.3) of a screw extruder.

11. The method (1) according to claim 10, wherein the screw elements (6.1, 6.2, 6.3) are arranged in a housing (4.1), and wherein the housing (4.1) has a contoured inner wall.

* * * * *